O. A. PARKER.
VEHICLE WHEEL.
APPLICATION FILED MAY 21, 1915.
1,294,825.
Patented Feb. 18, 1919.
4 SHEETS—SHEET 1.
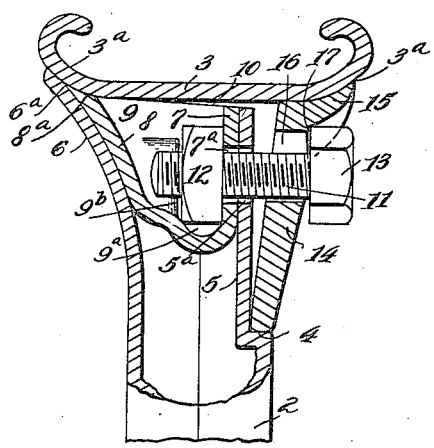
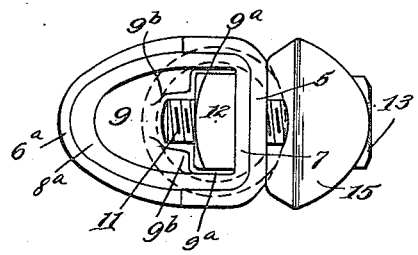
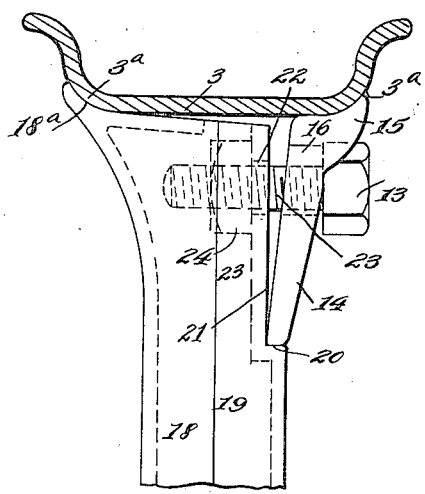
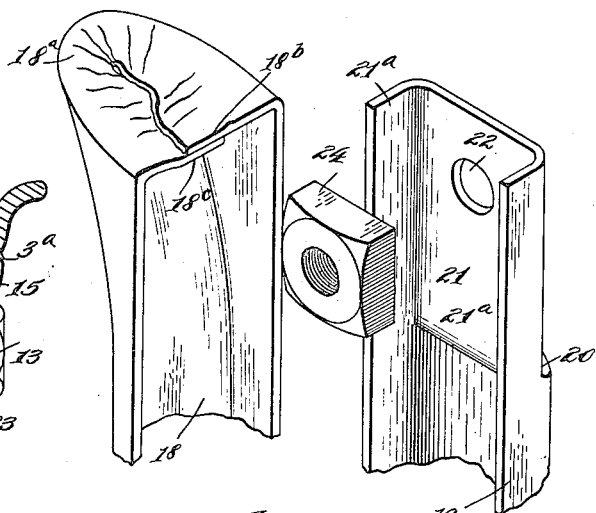
INVENTOR,
Orrel A. Parker,
BY Hull & Smith
ATTYS.

O. A. PARKER.
VEHICLE WHEEL.
APPLICATION FILED MAY 21, 1915.

1,294,825.

Patented Feb. 18, 1919.
4 SHEETS—SHEET 2.

INVENTOR,
Orel A. Parker,
BY Hill & Smith
ATT'YS.

O. A. PARKER.
VEHICLE WHEEL.
APPLICATION FILED MAY 21, 1915.

1,294,825.

Patented Feb. 18, 1919.
4 SHEETS—SHEET 3.

INVENTOR,
Orel A. Parker,
BY Hull & Smith,
ATT'YS.

UNITED STATES PATENT OFFICE.

ORREL A. PARKER, OF CLEVELAND, OHIO.

VEHICLE-WHEEL.

1,294,825. Specification of Letters Patent. Patented Feb. 18, 1919.

Application filed May 21, 1915. Serial No. 29,689.

*To all whom it may concern:*

Be it known that I, ORREL A. PARKER, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to vehicle wheels and more particularly to constructions whereby demountable rims may be conveniently applied thereto and detached therefrom. The invention herein relates to a wheel of the type shown in the patent to Gibson No. 986,452 issued Mar. 14, 1911, wherein a demountable rim is applied to the ends of the spokes instead of to a fixed felly, with the advantages resulting therefrom which are set forth in said patent. It is the general object of this invention to facilitate the application of the rim to the spoke-ends; to improve the means for so doing; also to provide improved constructions of the spoke ends, whereby correspondingly improved seats may be afforded for the rims. A still further object of the invention is to provide securing means of the type referred to with special reference to spokes which are made of metal, and particularly spokes made of pressed metal. Further and more limited objects of the invention will appear hereinafter and will be set forth in their essential combinations of elements in the claims hereto annexed.

Figure 5:
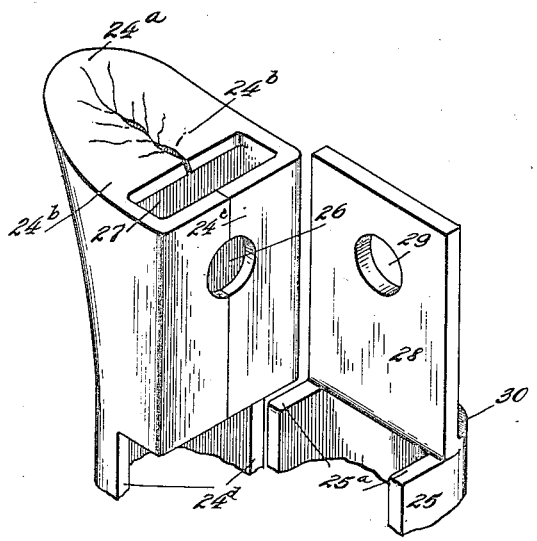
Figure 6:
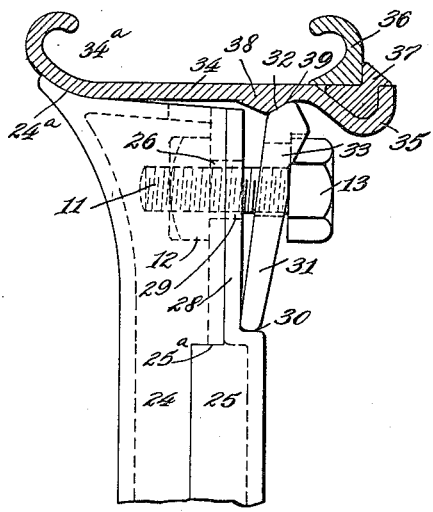
Figure 8:
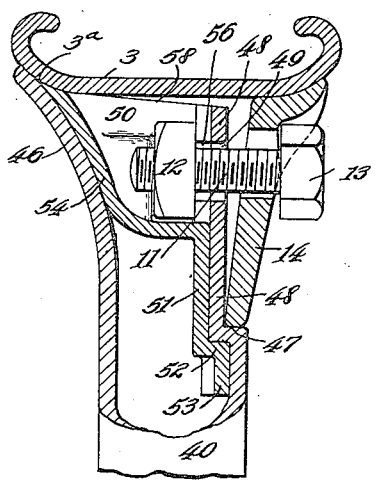
Figure 7:
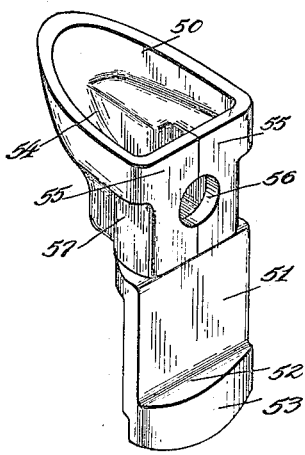
Figure 9:
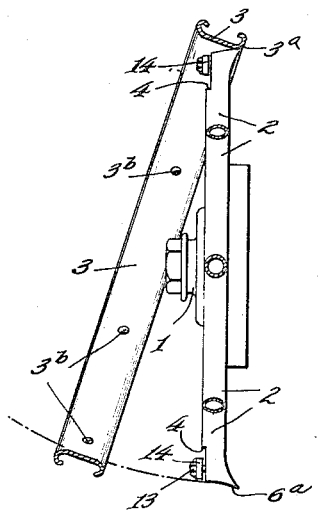
Figure 10:
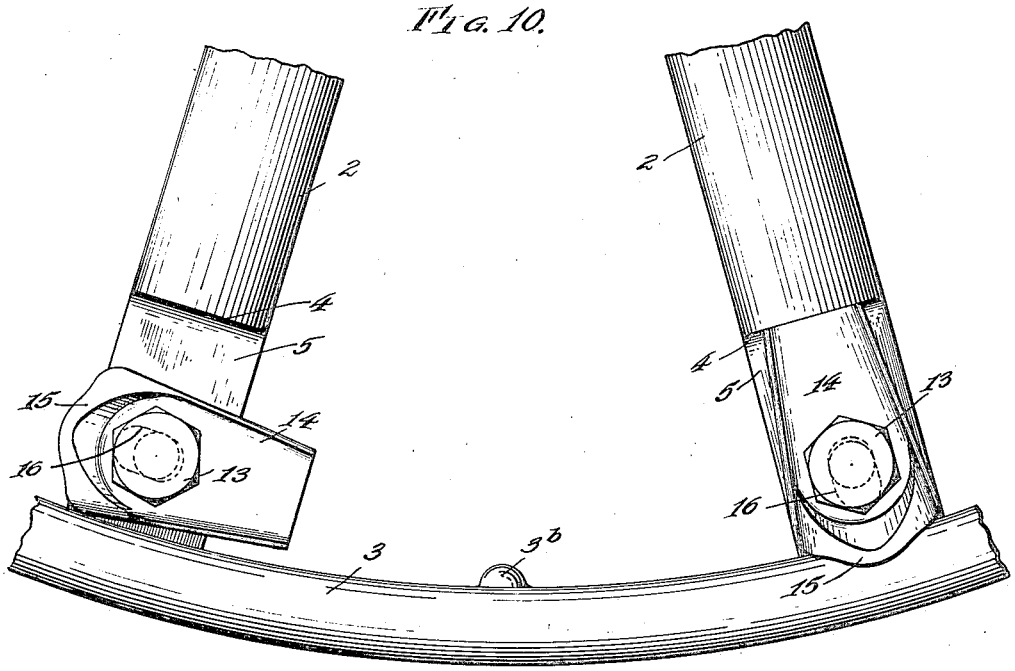
Figure 11:
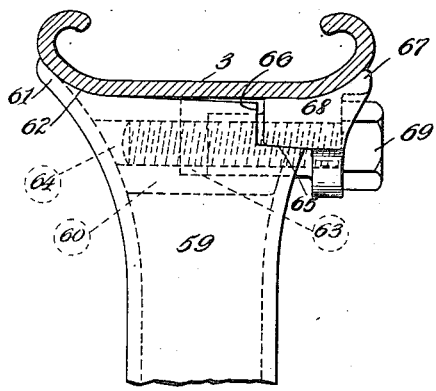
Figure 12:
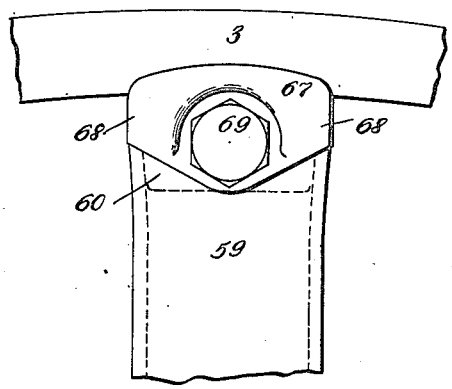
Figure 13:
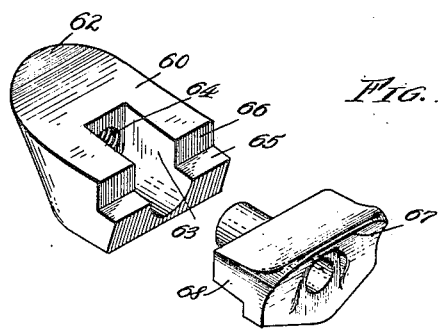
Figure 14:
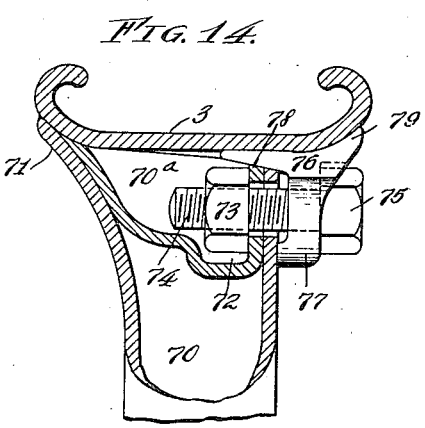
Figure 15:
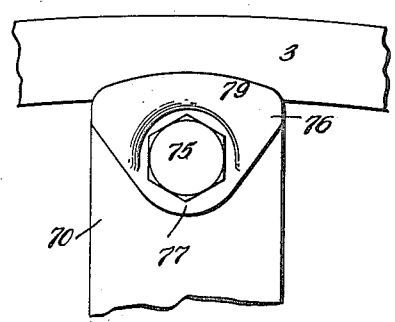

Referring to the drawings, Figure 1 is a central sectional view taken through the outer end of one of the spokes and showing the rim in place thereon; Fig. 2 is a plan view of one of the spoke ends, the rim being removed; Fig. 3 is a perspective view of a modification showing the detached or unassembled parts from which the outer end of a pressed metal spoke is formed and showing the nut for the clamping-lever bolt; Fig. 4 is an elevation of the outer end of the spoke constructed from the parts shown in Fig. 3, and showing the rim secured in place; Fig. 5 is a view, similar to Fig. 3, of a modified form of spoke end; Fig. 6 is a view in elevation of the spoke end which is produced by assembling the parts shown in Fig. 5 and showing the rim and clamping lever in place; Fig. 7 is a perspective view of a special cup or socket which is adapted to be placed within the outer end of a spoke; Fig. 8 is a sectional view through the end of a spoke having said cup or socket therein and showing the clamping lever and rim in place; Fig. 9 represents a side elevation of a wheel the spokes whereof are provided with my attaching means and showing the manner of applying a demountable rim thereto, parts of the wheel being shown in section; Fig. 10 is an enlarged detail showing the end portions of two adjoining spokes, with the corresponding rim segment in place, and illustrating the manner in which the rim may be applied without removing the clamping levers or clips; Figs. 11, 12 and 13 are respectively a side elevation, a front elevation, and a perspective view (with parts separated) of a further modified form of my invention; while Figs. 14 and 15 are respectively a side and a front elevation of a still further modification.

Referring to Fig. 9 of the drawings, 1 denotes the hub, 2 the spokes, and 3 the demountable rim of a wheel, the wheel shown herein being a metal wheel and the rim being shown as a rim of the ordinary clencher type. The spokes may be of cast or pressed metal, and the wheel may be conveniently formed of two lateral sections one section comprising the outer end of the hub and the outer halves of the spokes and the other section comprising the inner half of the hub and the inner halves of the spokes, these sections being suitably united by welding along their meeting edges. Referring more particularly to the embodiment of the invention shown in Figs. 1 and 2, each spoke 2 will have one side of its outer end inclined toward the center of the vehicle. The outer face of each spoke will be provided with a ledge or shoulder 4 from which there extends a substantially vertical face 5 forming a socket with the other end walls. Within the outer face 5 and inner face 6, there is located a cup the outer and inner walls 7 and 8 whereof are complementary to and fit against the corresponding walls 5 and 6 of the spoke socket. This cup (indicated generally at 9) has the outer end of its wall 8 beveled or inclined, as shown at 8ª, to form jointly with the end 6ª of the wall 6 an inclined arm or seat for one of the lateral seating portions 3ª of the demountable rim 3. The outer end of the spoke and of the cup 9 are gently tapered or beveled whereby a slowly tapered base is provided, as indicated at 10 in Fig. 1. This bevel, as indicated in Fig. 9, approximates the bevel or taper which would be produced by an arc described from the inner end of the opposite spoke or by a line tangent to such arc. It follows that the rim will be seated upon a slowly tapered base. With all previous rims of the type with which I am familiar, a clearance has been left between the inside or seating face of the rim and the adjacent face of the felly band or other mounting, which clearance extends to the inner edge of the felly band or mounting, where its curvature becomes abrupt. In the case of the felly type of wheels, this clearance is necessary in order to permit the insertion of the valve stem, and the clearance of the driving lugs, etc. In the spider type of wheel shown herein, the valve stem needs no consideration and the gentle taper of the ends of the spokes illustrated and described herein prevents the rim from being drawn out of center through the unequal tightening of the bolts. The tightening of any bolt of course tends to shift the rim an undue distance laterally and radially of the wheel at that point, but it is impossible for the portion of the rim which engages the fixed seat on the opposite side of the wheel to move radially inwardly as has been the case with previous constructions, due to the extended bearing which is provided between the inner portion of the rim and the coöperating portions of the spoke ends. Such radial inward movement of the rim is opposed by the ends of all of the opposite spokes pressing, not only against the curved portion of the rim but against the flat inside face of the rim itself.

The outer side wall 7 of the cup 9 and the outer side wall 5 of the spoke are provided with alined openings 7ᵃ and 5ᵃ respectively for a bolt 11, the opening being of considerably greater diameter than the bolt to permit the free play of the bolt therein. The bolt is provided with a nut 12 which is kept from turning by reason of the shape of the side walls of the cup 9, these side walls being projected inwardly to conform more or less to the shape of the nut and bolt end, as indicated at 9ᵃ and 9ᵇ, Fig. 2.

The bolt head 13 coöperates with the upper end of a locking lever arm or clamp 14, which is similar to the locking lever clamp shown in the Gibson patent aforesaid, the inner end of said lever arm being adapted to rest and pivot upon the shoulder 4 while the outer end is provided with a concaved seat 15 adapted to coöperate with the corresponding seating portion 3ᵃ of the rim. The bolt extends through an elongated aperture or slot 16 in the lever arm and this lever arm is provided with a bearing surface 17 for the bolt head 13, said bearing surface being adapted to be engaged by the bolt head when the lever is moved inwardly to its clamping position by the rotation of the bolt through its head. When the rim is applied to the ends of the spokes, it will be supported by each spoke along two lateral curved or inclined seating surfaces 3ᵃ by means of a fixed support having a seating surface or projection corresponding to one of the surfaces 3ᵃ and by means of a swinging lever arm having a seating surface or projection corresponding to the other surface 3ᵃ.

Reference has been made hereinbefore to the inclination of the outer edges 10 of the spokes. Such inclination is necessary in order to enable the rim to be conveniently applied to the ends of the spokes,—see Fig. 9. The axle having been jacked up, the rim will be slipped over the top spoke until the surface 3ᵃ engages the corresponding seat or stop at the inner side of this spoke. Then, swinging the rim on this point as a center, it can clear the inclined portions 10 of the other spokes and nothing will interfere with the quick engagement of the inner seating portion 3ᵃ with the corresponding extended inner seats on the spoke ends. During this operation, the lever arms 14 may be turned transversely of the spokes, by merely loosening the bolts 11 and, when the rim is in engagement with its inner seats, these lever arms can be turned to the vertical position shown in Fig. 1 and brought up to rim engaging position by adjusting the said bolts. The cup 9 enables me to use light-gage metal for the spokes while securing ample strength in the parts thereof which carry the rim and which support the movable clamp and its adjusting means. As is seen by reference to Fig. 9, the gentle taper 10 on the spoke ends approximates the curve described by swinging the rim about the inner seat or stop of the opposite spoke as a pivot, or approximates a tangent drawn to such curve. This construction gives all necessary clearance and at the same time prevents the rim from being eccentrically mounted upon the spokes.

In Figs. 3 and 4 there is shown a manner of forming the spoke ends which is particularly useful in connection with pressed metal constructions. In these views, 18 denotes the inner and 19 the outer lateral sections of a pressed metal spoke, these sections being suitably united, as by welding them along their meeting edges. The inner section 18 will be provided with a seat 18ᵃ for the corresponding seating portion 3ᵃ of the rim. In order to make the spoke ends largely dirt-excluding, the metal constituting the outer ends of the spoke sections 18 may be folded inwardly and one of the plies 18ᵇ may be folded over upon the other ply 18ᶜ, as shown in Fig. 3. The entire outer surface thus formed is inclined in the same manner as the edges of the spoke ends shown in Fig. 1, whereby clearance will be provided for the purpose of applying the rim to the spoke ends.

Furthermore this construction strengthens the rim-carrying parts of the spoke ends.

The outer spoke section 19 will be shaped so as to provide a shoulder 20 and a substantially vertical wall 21 therebeyond, the outer end of the section 19 being channel shaped. The wall 21 is provided with an aperture 22 therein for the reception of the bolt 23, and the nut 24 of said bolt will be of such size as to be prevented from turning by its engagement with the channel flanges 21$^a$. The clamping lever 14 is substantially identical with that shown in Fig. 1, and the parts thereof are identified by the same reference numerals that are applied to the clamping lever in said figure.

In Figs. 5 and 6 there is shown a further modification of the invention wherein the spokes are made of pressed metal and the socket construction is somewhat different from that disclosed in the preceding views. In these views, 24 denotes the inner and 25 the outer spoke section, these sections being conveniently united in the assembling process, as by electrically welding the edges thereof. The section 24 is provided with the seat 24$^a$ which is similar to the seats 6$^a$ and 13$^a$. The socket in this case may be made largely dirt-excluding by folding the metal inwardly, whereby the two flanges 24$^b$ form a web which covers the major portion of the socket, this web being inclined in the same manner as that which is provided at the end of the spoke of the preceding modification. The sides of the socket are bent toward each other, as shown at 24$^c$, whereby the inner side of the socket will be closed, and the flanges 24$^c$ may be united to form a web having the central aperture 26 therein for the bolt of the locking lever. An aperture 27 is provided between the inner end of the web formed by the flanges 24$^b$ and the flanges 24$^c$, which aperture is adapted to receive the nut which is applied to the locking bolt. The outer spoke member 25 is provided with a vertical wall 28 having an opening 29 therein adapted to register with the opening 26, the web 28 being located between the inner and the outer edges of the spoke section 25 and the outer edge or face of the socket formed at the top of the spoke section 24 overhanging the edges 24$^d$. This affords convenient means for securing the outer and inner spoke sections together and provides a seat for the inner end of the socket upon the shoulders 25$^a$ of the section 25. The outer spoke section is provided with a shoulder 30 pressed therefrom which is adapted to form a seat for the locking lever. The lever shown in Fig. 6 is of slightly different shape from that shown in the preceding views and comprises a substantially straight arm 31 having a beveled surface 32 at its outer end and provided with an elongated slot 33 adapted to receive the bolt 11. While any desired type of demountable rim may be used with my spoke-end construction, I have shown in Fig. 6 a rim 34, which is provided at its inner side with a seating surface 34$^a$ similar to the seating surface 3$^a$ on the preceding forms of rims, but which is provided at its outer side with a channel 35 and a removable flange 36, with a locking ring 37. This rim is shown as provided with a downwardly extending rib 38 having a beveled surface 39 which is adapted to be engaged by the inclined surface 32 of the locking lever.

In Figs. 7 and 8 I have shown a modification of the spoke-end construction, resembling more closely that of Figs. 1 and 2. In these views, 40 denotes the metal spoke end (which may be a casting) having its inner side 46 shaped similarly to the part 6 shown in Fig. 1 and provided at its outer side with a shoulder 47 and a vertical wall 48 extending from said shoulder to the end of the spoke, said wall being provided with an aperture 49 for the bolt 11. Within the outer end of the spoke there is placed a cup, which cup is shown in Fig. 7 and which may be of pressed metal. The cup is indicated generally at 50 and has a vertical outer wall 51 adapted to engage the wall 48, with a shoulder 52 adapted to fit under the shoulder 47 and a rounded extension 53 adapted to fit within and conform to the inner rounded face of the spoke. The inner wall 54 of the cup conforms to the inner wall 46 of the spoke end, while the sides of the cup are extended and pressed toward each other, as shown at 55, whereby they form a web which is adapted to aline with the wall 51, the web being provided with an aperture 56 which is adapted to register with the aperture 49. The sides of the cup are pressed inwardly, as shown at 57, whereby they provide means for engaging the nut 12 to prevent the same from turning with the bolt when the latter is adjusted by the application of a wrench to the head 13. The outer edges of the socket and of the cup are inclined, as shown at 58, whereby the same clearance is provided for the demountable rim as is the case with the preceding modifications.

As it may happen that the operator will fail to tighten the bolt sufficiently, or the bolts may unscrew slightly, whereby the rim might tend to creep and thus endanger the valve connection, I provide the rim with studs 3$^b$, preferably corresponding in number to the number of spokes on the wheel. In applying the rim to the spoke ends, the studs should be placed between the spokes. Then, should the rim happen to creep, it can creep only until the first stud engages the side of the spoke end, whereupon further creeping will be prevented, and the danger of cutting or breaking off the valve stem will be avoided.

In Figs. 11–13 there is shown a still further modification of my invention wherein the spoke end is provided with a movable clamping wedge which is adapted to be tightened thereby to force the rim upon the spoke end arm and to retain the outer side of the rim in operative relation to the spoke end while providing means whereby the movable clamping wedge may be retained upon the spoke end pending the application of the rim thereto. In these views, the spoke end 59 is shown as made of light metal (preferably sheet metal) having a block 60 applied to the upper end thereof and having at its inner end the upwardly projecting arm 61, similar to the arms of the other modifications. The inner end of the block is projected outwardly, as shown at 62, thereby to conform to the contour of the spoke end as well as to reinforce the inner seat for the demountable rim. The block and the spoke end are tapered to provide clearance for the demountable rim 3. The block is provided with a recess 63, extending downwardly from the top and inwardly from the outer surface thereof, and with a threaded bore 64 extending inwardly from said recess. Lateral shoulders 65 and vertical shoulders 66 are provided on each side of the bore 63, the shoulders 65 being inclined.

Coöperating with the block and with the arm 61 is a wedge comprising a body having an upwardly extending curved arm 67 and lateral wings 68. The outer lateral face of the wedge block is provided with a recess for the accommodation of the head 69 of a machine bolt, which is adapted to extend through the wedge block and to be threaded into the bore 64, the wings 68 riding upon the inclined shoulders 65.

With the parts constructed as described, the operation will be evident. The bolt may be unscrewed a sufficient distance to allow the wings 68 to clear the shoulders 65 whereupon the wedge block may be inverted, which will allow the demountable rim to be applied to the spoke end and to be thrust against the parts 61 and 62. The wedge block may then be turned over and the bolt adjusted to bring the parts to substantially the position shown in Fig. 11, the wedge being moved radially by its movement along the shoulders 65.

In Figs. 14 and 15 there is shown a still further modification, wherein the top 70 of the spoke is provided with an arm 71 against which the inner side of the demountable rim 3 is adapted to bear, as in the preceding modifications. The outer end of the spoke is provided with a cup 70ª which is recessed thereby to provide a chamber 72 for retaining against rotation a nut 73 on a bolt 74. This bolt extends through elongated slots in the walls of the spoke and of the cup and is provided with a head 75. Mounted upon the bolt is a combined wedge and lever, the body whereof is indicated at 76. The lower end 77 of this body is adapted to bear against the outer face of the spoke. The inner upper end of the body is tapered, as shown at 78, and coöperates with a like tapered seat on the spoke end. The block is shaped to conform to the rounded side of the rim, as shown at 79. In operation, as the bolt is tightened, the lower end of the block will exert more or less pressure against the spoke wall. When the block is near its inner adjusted position, it will be moved radially by means of the inclined surface 78, moving along the inclined seat on the spoke end, thereby to thrust the outer side of the rim radially.

Having thus described my invention, what I claim is:—

1. In a vehicle wheel, the combination of a plurality of spokes each having a hollow metallic outer end, a cup within each such outer end, one side of such outer end and the cup forming jointly a seat for a demountable rim, a movable member on the opposite side of the spoke end from such seat and adapted by its adjustment to engage the opposite seating portion of such rim, and adjusting means for said member extending into said cup and operatively connected thereto.

2. In a vehicle wheel, the combination of a plurality of spokes each having a hollow metallic outer end and a rim seat at one side of each such end, a cup within each such end, a movable member on the opposite side of the spoke end from such seat and adapted by its adjustment to engage the opposite seating portion of such rim, and adjusting means for said member extending into said cup.

3. In a vehicle wheel, the combination of a plurality of spokes each having a hollow metallic outer end, a cup within each such outer end, one side of such outer end and the cup forming jointly an outwardly extending seat for a demountable rim, said cup extending alongside of and reënforcing the wall of the spoke end which is opposite said seat, a movable member on the opposite side of the spoke end from said seat and adapted by its adjustment to engage the opposite seating portion of a demountable rim, and an adjusting bolt connected to said member and extending through the adjacent walls of the spoke and cup.

4. In a vehicle wheel, the combination of a plurality of spokes each having a hollow metallic outer end, a cup within each such outer end, one side of such outer end and the cup forming jointly a lateral seat for a demountable rim, said cup extending alongside of and reënforcing the wall of the spoke end which is opposite said seat, a movable member on the opposite side of the spoke end from said seat and adapted by its adjustment to engage the opposite lateral seating portion of such rim, and adjusting means for said member extending through the adjacent walls of the spoke and cup and operatively connected thereto.

5. In a vehicle wheel the combination of a plurality of hollow metallic spokes, a hollow metal cup in the outer end of each spoke and reënforcing the walls thereof, said cup and spoke end having jointly an outwardly projecting seat or arm adapted to be engaged by a corresponding lateral seating surface at one side of a demountable rim, a movable member adapted to engage the opposite seating surface of such rim, and adjusting means for said member extending through the adjacent walls of the spoke end and cup.

6. In a vehicle wheel the combination of a plurality of hollow metallic spokes, a hollow metal cup in the outer end of each spoke and reënforcing the walls thereof, said spoke end having an outwardly projecting seat or arm adapted to be engaged by a corresponding seating surface at one side of a demountable rim, a movable member adapted to engage the opposite seating surface of such rim, and adjusting means for said member extending through and operatively connected to said cup.

7. In a vehicle wheel, the combination of a plurality of spokes each having a hollow outer metallic end and each outer end having at one side thereof an outwardly extending seat or arm adapted to engage a corresponding lateral seating portion of a demountable rim, a cup within the outer end of the spoke, a laterally movable member on the opposite side of the spoke end from said seat and adapted to engage an oppositely arranged seating portion of such rim, and adjusting means for said member comprising a bolt having a head on the outside of the spoke and a nut within the cup, there being means associated with the cup for preventing the nut from turning on the bolt.

8. In a vehicle wheel, the combination of a plurality of spokes each having a hollow outer metallic end and each outer end having at one side thereof an outwardly extending seat or arm adapted to engage a corresponding lateral seating portion of a demountable rim, a cup within the outer end of the spoke, a laterally movable member on the opposite side of the spoke end from said seat and adapted to engage an oppositely arranged seating portion of such rim, and adjusting means for said member extending into the spoke and cup.

9. In a vehicle wheel, the combination of a plurality of spokes each having a hollow metallic outer end, a cup within said outer end, one side of such outer end and the cup forming jointly an outwardly extending seat for a lateral seating portion of a demountable rim said cup extending alongside of and reinforcing the wall of the spoke which is opposite said seat, a movable member on the opposite side of the spoke end from said seat and adapted by its adjustment to engage the opposite seating portion of such rim, an adjusting bolt connected to said member and extending through the adjacent walls of the spoke and cup, said bolt having a nut thereon within the cup and the cup having means to prevent the rotation of the nut with the bolt.

10. In a vehicle wheel, the combination of a plurality of spokes each having a hollow metallic outer end, a pressed metal cup in the outer end of such spoke, one of the walls of said cup and one of the lateral walls of the spoke end being extended outwardly to form jointly a projecting arm or seat for one of the lateral seating portions of a rim and the opposite side of said cup being extended along the opposite side of the spoke end to reinforce the same, portions of the walls of the cup intermediate of the aforesaid walls being pressed toward each other, a movable member located outside of the spoke end and on the side opposite from such seat and having a portion which, by the adjustment of such member is adapted to engage the opposite lateral seating portion of the rim, a bolt connected to said member and the adjacent walls of the spoke and cup and having a head on the outside of the spoke and a nut within the space provided by pressing inwardly the walls of said cup.

11. In a vehicle wheel, the combination of a plurality of spokes each having a fixed lateral seat and an adjustable lateral seat for a demountable rim, and a rim adapted to be applied to said seats and having one or more inwardly extending projections adapted to engage a spoke end to limit the creeping of said rim.

12. In a vehicle wheel, the combination of a series of spokes each having a hollow metallic outer end and a cup within such end, each spoke end having at one side thereof a seat or arm adapted to engage a corresponding lateral seating portion of a demountable rim, a laterally movable member on the opposite side of the spoke end from the said seat or arm and adapted to engage an oppositely arranged lateral seating portion of such rim, and means connected to said laterally movable member and to a spoke end for adjusting the said member.

13. In a vehicle wheel, the combination of a plurality of spokes each having at one side thereof a projection adapted to engage a corresponding lateral seating portion of a demountable rim, each spoke end having a slowly tapered base extending transversely thereof from such projection whereby the side of the rim and a portion of the base thereof may be seated against such projection and the portion of the base adjacent thereto, a laterally movable member at the opposite side of the spoke end from said projection and adapted to engage an oppositely located seating portion of such rim, and means for adjusting said laterally movable member toward and from the said projection.

14. In a vehicle wheel, the combination of a plurality of spokes each having at one side thereof an outwardly extending seat to receive a corresponding lateral seating portion of a demountable rim, said seat and said seating portion extending the greater part of the distance from the inner edge of the wheel to the center line thereof, each spoke end having a slowly tapered base extending transversely thereof from said seat to the outer edge of the wheel, a laterally movable member at the opposite side of the spoke end from said seat and adapted to engage an oppositely located seating portion of said rim, and means for adjusting said laterally movable member toward and from the said seat.

In testimony whereof, I hereunto affix my signature in the presence of two witnesses.

ORREL A. PARKER.

Witnesses:
O. P. STEEN,
H. O. DAVIDSON.